United States Patent [19]

Wonn

[11] Patent Number: 4,643,283
[45] Date of Patent: Feb. 17, 1987

[54] TORQUE CONVERTER SLIPPING CLUTCH AND CONTROL

[75] Inventor: Quinby E. Wonn, Farmington, Mich.

[73] Assignee: General Motors Corporation, Detroit, Mich.

[21] Appl. No.: 778,868

[22] Filed: Sep. 23, 1985

[51] Int. Cl.⁴ .............. F16D 39/00; F16D 47/06; F16D 3/80

[52] U.S. Cl. .................. 192/3.33; 192/54; 188/290; 251/48; 464/66

[58] Field of Search ............ 192/3.29, 3.3, 3.33, 192/54; 188/290, 322.5; 251/48; 464/66, 67, 68, 24

[56] References Cited

U.S. PATENT DOCUMENTS

| | | | |
|---|---|---|---|
| 2,337,134 | 12/1943 | Thelander | 464/66 X |
| 3,966,031 | 6/1976 | Peterson, Jr. et al. | 192/54 X |
| 4,148,200 | 4/1979 | Schallhorn et al. | 464/66 X |
| 4,167,993 | 9/1979 | Vukovich et al. | 192/3.3 |
| 4,351,167 | 9/1982 | Hanke et al. | 464/24 |
| 4,570,764 | 2/1986 | Nishimura | 192/3.29 |

FOREIGN PATENT DOCUMENTS 154088 9/1985 European Pat. Off. ............ 464/24

Primary Examiner—Allan D. Herrmann
Attorney, Agent, or Firm—Donald F. Scherer

[57] ABSTRACT

A torque converter and slipping clutch assembly has an adjustable apply orifice which establishes the torque split between the torque converter and the clutch. The orifice controls fluid communication between clutch engagement and disengagement chambers to establish the effective clutch apply pressure. A viscous damper is connected to the clutch and torque converter in parallel with the orifice to prevent rapid adjustment of the orifice during transient torque impulses.

2 Claims, 1 Drawing Figure

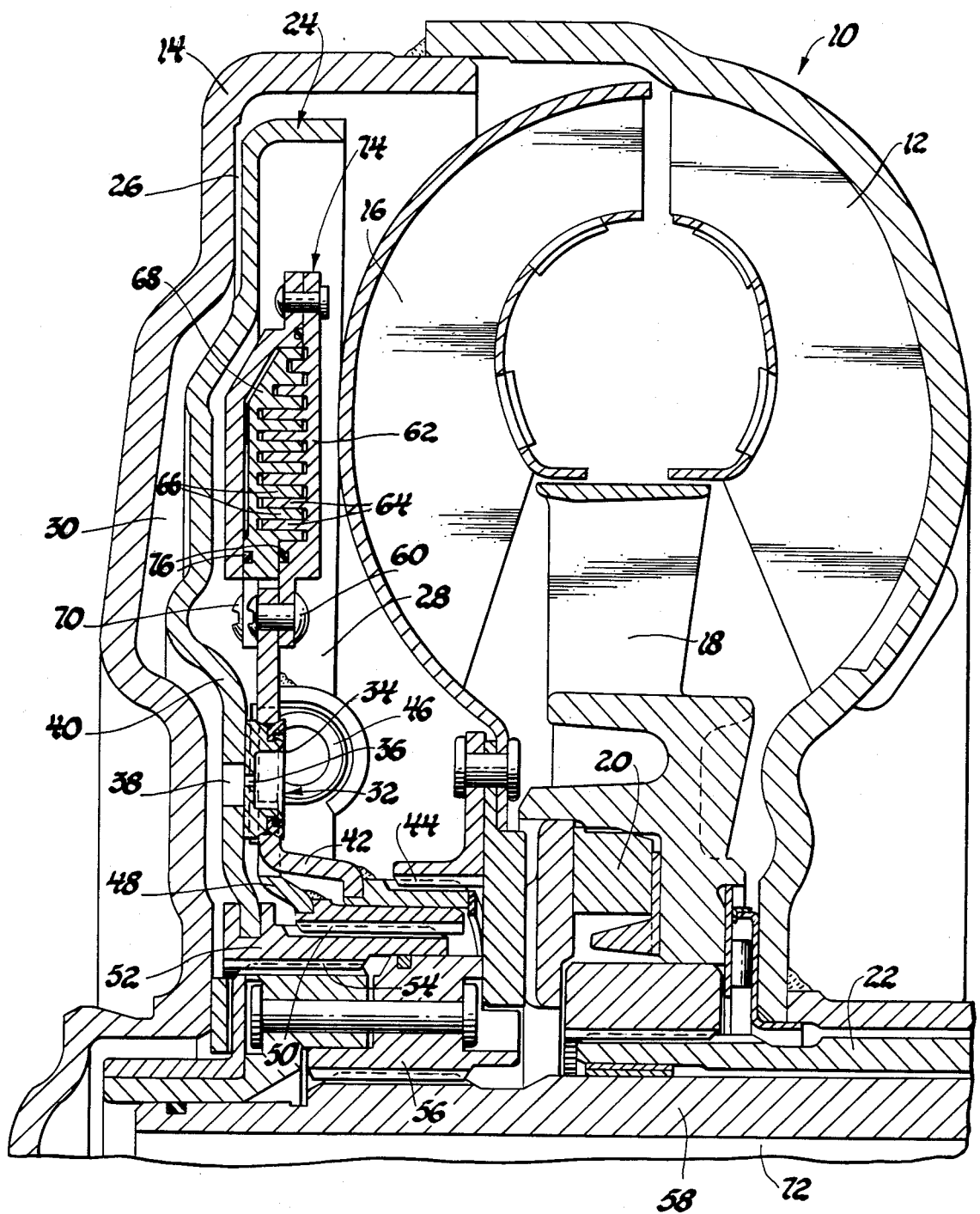

4,643,283

TORQUE CONVERTER SLIPPING CLUTCH AND CONTROL

BACKGROUND OF THE INVENTION

This invention relates to torque converter clutch controls and more particularly to the damping of slipping clutch controls.

SUMMARY OF THE INVENTION

It is an object of this invention to provide an improved torque converter and slipping clutch wherein the slipping clutch has a control orifice or restriction adapted to connect the apply and release chambers of the slipping clutch to control the torque transmission thereby, and wherein the control orifice or restriction is connected in the torque transmission path with viscous damping means to limit adjustment of the orifice during transient torque impulses and provide clutch stability.

It is another object of this invention to provide an improved torque converter and slipping clutch wherein the slipping clutch has an apply chamber and a release chamber and a variable ratio flow restrictor connected between the chambers and responsive to the torque transmitted by the torque converter to adjust the flow restrictor to control clutch torque transmission, and wherein the variable flow restrictor has a viscous damper connected thereto to reduce the responsiveness of the variable flow to transient torque impulses.

DESCRIPTION OF THE DRAWING

These and other objects and advantages of the present invention will be more apparent from the following specification and drawing which is a cross-sectional view of a torque converter and clutch incorporating the present invention.

DESCRIPTION OF THE PREFERRED EMBODIMENT

Referring to the drawing, there is seen a torque converter 10, having an impeller 12 which is secured for rotation with an input shell 14, and adapted to be driven by a prime mover, not shown. The torque converter 10 is a conventional fluid drive mechanism and includes a turbine 16 and a stator 18 disposed in toroidal flow relation with the impeller 12. The stator 18 is connected through a one-way mechanism 20 to a stator shaft 22 which is grounded within the transmission in a well-known manner.

Disposed between the turbine 16 and the input shell 14 is a clutch assembly 24 which includes a friction pad 26 adapted to frictionally engage the input shell 14. The clutch assembly 24 divides the space between the turbine 16 and the input shell 14 into an apply chamber 28 and a release chamber 30. The apply chamber 28 and release chamber 30 are in fluid communication through a variable flow restrictor assembly or orifice 32. The restrictor assembly 32 includes a valve element 34 having an aperture 36 formed therein, and an opening 38 formed in a plate portion 40 of the clutch assembly 24. The valve element 34 is disposed in a hub 42 which is drivingly connected through a spline 44 to the turbine 16. The hub 42 is also drivingly connected to one side of a compression spring 46, the other side of which is connected to a hub 48. The hub 48 is drivingly connected through a spline 50, with a clutch hub 52 which is a portion of the clutch assembly 24 and is secured to the plate 40. The hub 52 is drivingly connected through a spline 54 and a hub assembly 56 to an output shaft 58. The output shaft 58 is connected to drive a conventional planetary type transmission, not shown.

The hub 42 has secured thereto by fasteners 60, a damper housing 62. The damper housing 62 has formed therein a plurality of axially extending cylindrical members 64 which are interleaved with a plurality of axially extending cylindrical members 66. The cylindrical members 66 are integral with a damper body 68 which is secured by fasteners 70 to the hub 48.

The torque converter 10 and clutch assembly 24 cooperate to provide a torque converter and slipping clutch assembly which operates in a torque splitting manner similar to the torque converter and slipping clutch described in U.S. Pat. No. 3,966,031, issued June 29, 1967 to Peterson, Jr. et al.

In such torque converter and slipping clutch systems, it is well-known to supply fluid pressure to the torque converter between the stator 18 and impeller 12, and to exhaust the fluid therefrom through an orifice, not shown, located downstream of passage 72. When pressurized fluid is administered in this manner, a pressure differential, depending on the restrictor assembly 32, will be developed between the apply chamber 28 and the release chamber 30. This pressure differential determines the torque capacity of the clutch assembly 24. The larger the opening of the restriction provided by the restrictor assembly 32, the lower the differential pressure will be, and therefore, the lower the torque capacity of clutch 24 will be. Since the torque converter 10 and clutch assembly 24 must split the torque which is delivered by the prime mover, a low capacity in clutch 24 will result in higher torque transmission by the turbine 16 and vice versa. The torque which is transmitted by turbine 16 must pass through hub 42 and spring 46 to hub 48, where it is combined with the torque transmitted by the clutch assembly 24.

The level of torque transmitted by the turbine 16 will determine the opening or the flow restriction size of the restrictor assembly 32. With increased torque transmission, the spring 46 will compress and the opening of restrictor assembly 32 will be reduced. The reduction in the opening of restrictor 32 will result in a higher differential pressure between apply chamber 28 and release chamber 30. This higher differential pressure will cause increased torque capacity in the clutch assembly 24 and thereby reduce the torque transmitted by the turbine 16 such that the restrictor 32 will operate at a desired torque split between the turbine 16 and the clutch assembly 24.

It has been found, however, that transient torque disturbances or impulses can originate at the shaft 58 as a result of the vehicle wheels encountering rough terrain such as a bump. When this occurs, there is a rapid change in the torque requirement of the vehicle, such that the clutch capacity may be greater than the transmission requirement, in which case, the clutch assembly 24 will attempt to transmit a higher percentage of the torque such that it will accelerate relative to the turbine 16. This transient torque impeller is damped by a viscous damper 74 which is comprised of the damper housing 62 and damper body 68. The damper housing 62 and damper body 68 are close fitting components whose structure is well-known. The interior of the housing 62 is sealed from the environment by a pair of annular seals 76. While these two components are fitted with close tolerances, there is space for a fluid between these components. A silicone oil is generally used as a damper fluid in dampers such as that shown. The acceleration forces between the damper housing 62 and damper body 68 are resisted or restricted by the fluid thereby limiting the travel of the valve 34 relative to the opening 38. The viscous damper 74 therefore effectively prevents or significantly restricts any effect that the transient torque impulses might have on the restrictor assembly 32. This improves the stability of the clutch.

As is well-known, the clutch assembly 24 can be fully released by admitting fluid under pressure to the passage 72 formed in the shaft 58, and exhausting the fluid from the torque converter 10 through the space between the stator shaft 22 and the impeller 12. Control mechanisms for fluid flow reversal in torque converters are well-known in the prior art.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A controlled slip torque converter and clutch comprising; an input shell; a torque converter means having an impeller drivingly connected with said input shell, a turbine and a stator disposed for toroidal flow, said torque converter means transmitting drive torque from said impeller to said turbine in a slipping relation; clutch means engageable in response to fluid pressure to limit the slip relation between the impeller and turbine and being disposed in drive relation between said input shell and said turbine and cooperating therewith to form clutch apply chamber means and clutch release chamber means; variable flow restriction means including spring means disposed between said clutch apply chamber means and said release chamber means for providing a controlled flow from said apply chamber means to said release chamber means; and viscous damper means disposed in parallel relation with said spring means on said variable flow restriction means and being responsive to torque disturbances at said clutch means and said turbine to restrict the rate at which the flow restriction means varies.

2. A controlled slip torque converter and clutch comprising; an input shell; a torque converter means having an impeller drivingly connected with said input shell, a turbine and a stator disposed for toroidal flow, said torque converter means transmitting drive torque from said impeller to said turbine in a slipping relation; clutch means engageable in response to fluid pressure to limit the slip relation between the impeller and turbine and being disposed in drive relation between said input shell and said turbine and cooperating therewith to form clutch apply chamber means and clutch release chamber means; variable flow restriction means including spring means disposed between said clutch apply chamber means and said release chamber means for providing a controlled flow from said apply chamber means to said release chamber means; and viscous damper means disposed in parallel relation with said spring means on said variable flow restriction means including a pair of relatively movable members with one of the members secured to the turbine and the other member secured to the clutch means, and said viscous damper means being responsive to torque disturbances at said clutch means and said turbine to restrict the rate at which the flow restriction mean varies.

* * * * *